US012754297B2

(12) United States Patent
Teyssier et al.

(10) Patent No.: US 12,754,297 B2
(45) Date of Patent: Oct. 6, 2026

(54) TIME-OF-FLIGHT SENSOR AND METHOD FOR ADJUSTING AN EXPOSURE TIME OF SUCH A SENSOR

(71) Applicants: STMicroelectronics France, Montrouge (FR); STMICROELECTRONICS (GRENOBLE 2) SAS, Grenoble (FR)

(72) Inventors: Jeremie Teyssier, Grenoble (FR); Antoine Drouot, Paris (FR); Thibault Augey, Grenoble (FR); Valerie Pena-Laroche, Grenoble (FR)

(73) Assignees: STMicroelectronics France, Montrouge (FR); STMICROELECTRONICS (GRENOBLE 2) SAS, Grenoble (FR)

( * ) Notice: Subject to any disclaimer, the term of this patent is extended or adjusted under 35 U.S.C. 154(b) by 711 days.

(21) Appl. No.: 18/320,849

(22) Filed: May 19, 2023

(65) Prior Publication Data

US 2023/0393250 A1 Dec. 7, 2023

(30) Foreign Application Priority Data

Jun. 2, 2022 (FR) ....................................... 2205309

(51) Int. Cl.

| | |
|---|---|
| ***G01S 7/4912*** | (2020.01) |
| ***G01S 7/481*** | (2006.01) |
| ***G01S 7/4915*** | (2020.01) |
| ***G01S 17/894*** | (2020.01) |

(52) U.S. Cl.
CPC .......... *G01S 7/4918* (2013.01); *G01S 7/4816* (2013.01); *G01S 7/4915* (2013.01); *G01S 17/894* (2020.01)

(58) Field of Classification Search
CPC .... G01S 7/4918; G01S 7/4915; G01S 17/894; G01S 7/4868; G01S 7/4816
USPC .............................................................. 356/5
See application file for complete search history.

(56) References Cited

U.S. PATENT DOCUMENTS

| | | | | |
|---|---|---|---|---|
| 8,768,010 | B2 * | 7/2014 | Korekado | G01S 7/4915 382/106 |
| 2013/0307968 | A1 | 11/2013 | Forster | |
| 2017/0353649 | A1 * | 12/2017 | Yang | G01S 7/4865 |
| 2021/0183018 | A1 | 6/2021 | Tubert et al. | |

FOREIGN PATENT DOCUMENTS

| | | |
|---|---|---|
| DE | 102019104566 A1 | 8/2020 |

OTHER PUBLICATIONS

Jongenelen et al., "Analysis of Errors in ToF Range Imaging With Dual-Frequency Modulation," IEEE Transactions on Instrumentation and Measurement, vol. 60, No. 5, pp. 1861-1868, May 2011.

* cited by examiner

*Primary Examiner* — Susan E. Hodges
(74) *Attorney, Agent, or Firm* — Seed Intellectual Property Law Group LLP

(57) ABSTRACT

An indirect time-of-flight measurement sensor includes a photosensitive pixel array configured to acquire a succession of images of a scene during a given exposure time. The sensor includes a control unit configured to control the acquisition of the succession of images by the pixel array and to define an exposure time for this acquisition based on a pixel saturation rate of the array, distances between the sensor and elements of the scene, and a standard deviation of the distances between the sensor and the elements of the scene.

12 Claims, 2 Drawing Sheets

[Fig. 1]
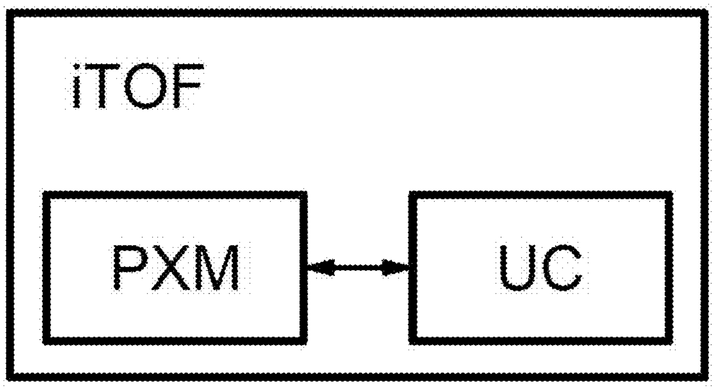
[Fig. 2]
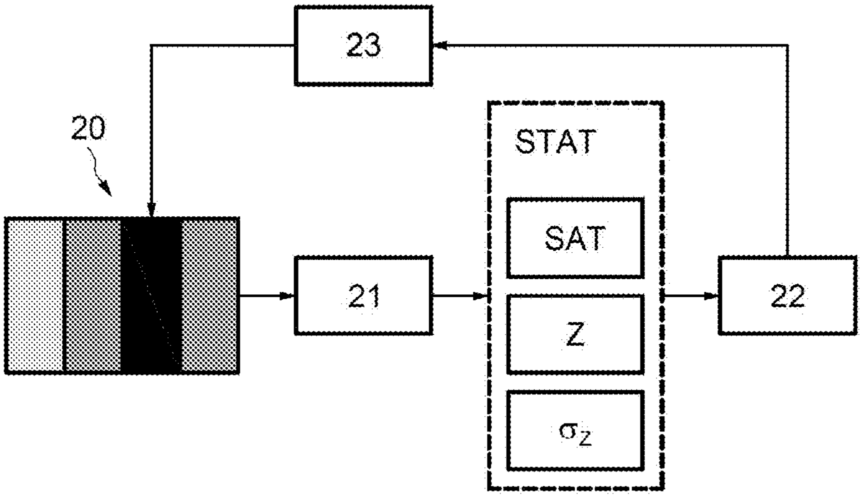

[Fig. 3]
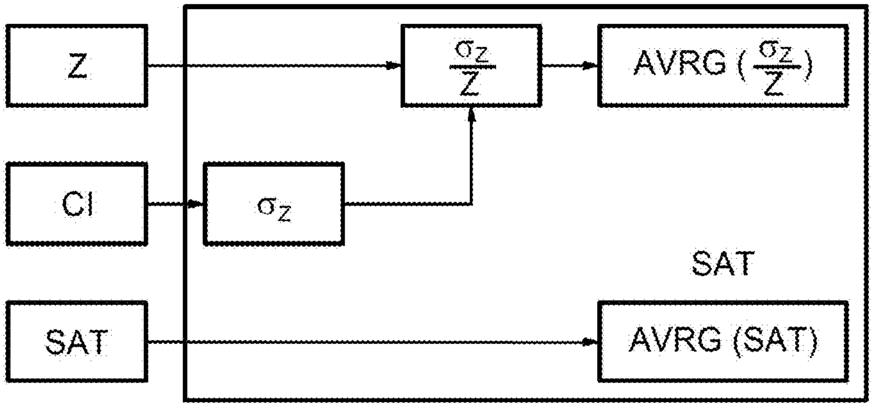
[Fig. 4]
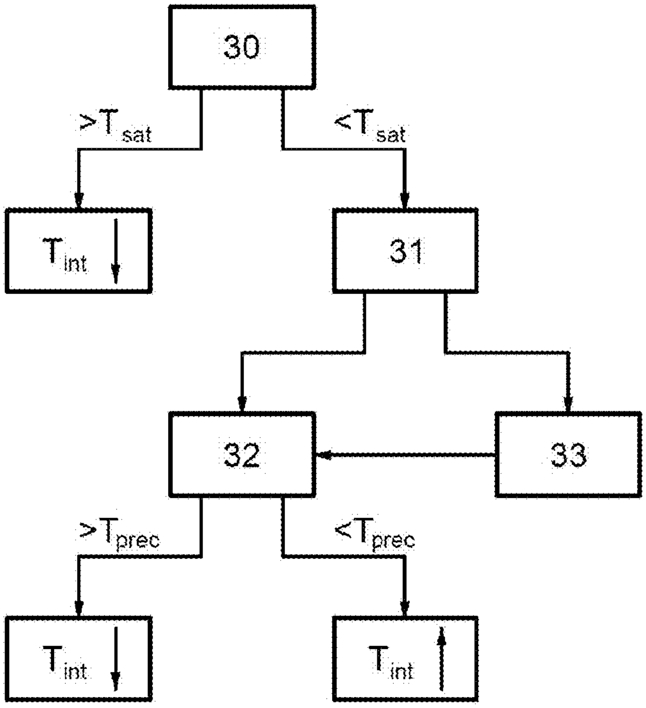

TIME-OF-FLIGHT SENSOR AND METHOD FOR ADJUSTING AN EXPOSURE TIME OF SUCH A SENSOR

BACKGROUND

Technical Field

Embodiments and implementations relate to time-of-flight sensors, and more particularly indirect time of flight measurement sensors (also known by the acronym "iTOF" for "indirect time of flight").

Description of the Related Art

A time-of-flight sensor is a sensor that makes it possible to measure distances between a sensor and elements of a scene. The time-of-flight sensor includes a photosensitive pixel array. The time-of-flight sensor is configured to calculate a distance for each one of its pixels.

There are direct time-of-flight measurement sensors and indirect time-of-flight measurement sensors.

A direct time-of-flight measurement sensor is configured to calculate a distance between this sensor and an element of a scene from a measurement of the time between the emission of the signal by the sensor and the reception of the signal reflected by the element.

An indirect time-of-flight measurement sensor, also designated by the expression "iTOF sensor" in what follows, is configured to calculate a distance between this sensor and an element of the scene from a measurement of a phase shift between a signal emitted by the sensor and a signal reflected by the element and detected by the sensor.

Each photosensitive pixel of the array delivers data relative to the signal detected by this pixel. The pixel array thus makes it possible to obtain a data array delivered by the pixel array. This data matrix then forms an image of the scene.

More particularly, the iTOF sensor is configured to acquire a plurality of successive images of the scene in order to determine the phase shift between the emitted signals and the reflected signals.

The iTOF sensor can be subjected to a wide diversity of conditions of the scene (level of ambient light, distance and reflectivity of objects). Because of this, it is suitable to adapt the exposure time of the iTOF sensor according to the conditions of the scene.

Conventionally, the exposure time of the iTOF sensor is adapted according to a saturation rate of the pixel array, i.e., a filling rate of the pixels.

In particular, the exposure time is adjusted until the saturation rate is greater than or equal to a given saturation rate threshold.

Such a control of the exposure time has the disadvantage of substantially increasing the exposure time when the luminosity of the scene is low.

However, the longer the iTOF sensor is exposed, the more substantial its energy consumption is.

BRIEF SUMMARY

There is therefore a solution that makes it possible to optimize the exposure time of the acquisitions of an iTOF sensor and to reduce the energy consumption of such a sensor would be beneficial.

According to an embodiment, an indirect time-of-flight measurement sensor is proposed including:

- a photosensitive pixel array configured to acquire a succession of images of a scene during a given exposure time,
- a control unit configured to control an acquisition of a succession of images by the pixel array and to define an exposure time for this acquisition according to a pixel saturation rate of the array, distances between the sensor and elements of the scene and a standard deviation of the distances between the sensor and the elements of the scene.

In one embodiment, an indirect time-of-flight measurement sensor is thus configured to adapt the exposure time (also designated by the expression "integration time") for an acquisition of a succession of images not only according to a saturation rate of the sensor but also according to the distance between the elements of the scene and the sensor as well as the standard deviation of the distances between the elements of the scene and the sensor. In particular, the distance between the elements of the scene and the sensor as well as the standard deviation of the distances between the elements of the scene and the sensor make it possible to define a precision of the acquisition with respect to the distance of the elements of the scene with respect to the sensor. The sensor is therefore configured to adapt the exposure time according to a saturation rate of the sensor and a precision of the acquisition. Such an adjustment of the exposure time makes it possible to optimize a compromise between an energy consumption of the sensor and a signal-to-noise ratio of the sensor. Indeed, in certain cases, in particular when the sensor is located in a dark room, if the exposure time is adjusted only according to the pixel saturation rate, then the exposure time can be very long due to the fact that only the light emitted by the sensor can increase the pixel saturation rate. This results in a substantial energy consumption of the sensor and a precision of the sensor greater than what is desired. By taking account of the precision of the acquisition to define the exposure time, it is possible to reduce the exposure time to obtain a desired precision and a desired saturation of the pixels. The sensor therefore makes it possible to prevent an undesired increase in the exposure time which would result in excessively high precision of the sensor with respect to the distance of the elements of the scene with respect to the sensor.

In an advantageous embodiment, the control unit is configured to define the exposure time for each acquisition from the pixel saturation rate of the array and a precision of the sensor corresponding to a ratio between the distances between the sensor and elements of the scene and the standard deviation of the distances between the sensor and the elements of the scene.

In an advantageous embodiment, the control unit is configured to compare the pixel saturation rate with a saturation rate threshold, and to:

- if the pixel saturation rate is greater than the saturation rate threshold, reduce the exposure time,
- otherwise compare the precision to a precision threshold, and
  - if the precision is greater than the precision threshold, reduce the exposure time,
  - otherwise, increase the exposure time.

The saturation rate is thus the first statistic verified to define the exposure time. This makes it possible to prevent saturating the pixels of the array.

Preferably, the control unit is configured to adjust the exposure time of the sensor by increasing or by reducing the value of the exposure time by a percentage between a minimum step and a maximum step. This minimum step and this maximum step are defined parameters known by the control unit.

Advantageously, the precision is evaluated from the mathematical formula $$\frac{z^2}{\sigma_z^2},$$

wherein z is a distance between an element of the scene with respect to the sensor and $\sigma_z$ is the standard deviation of the distances between the sensor and the elements of the scene.

The mathematical formula $$\frac{z^2}{\sigma_z^2}$$

has the advantage or varying linearly with respect to the exposure time.

In an advantageous embodiment, if the saturation rate threshold is incompatible with the precision threshold, then the control unit is configured to update the precision threshold with the saturation rate. This makes it possible to prevent a blinking phenomenon of the luminosity of the images acquired.

According to another aspect, a method is proposed for defining an exposure time for an acquisition of a succession of images of a scene by photosensitive pixels of a pixel array of an indirect time-of-flight measurement sensor during a given exposure time, the method including a definition of the exposure time for the acquisition according to a pixel saturation rate of the array, distances between the sensor and elements of the scene and a standard deviation of the distances between the sensor and the elements of the scene.

Preferably, the method includes a definition of the exposure time for the acquisition from the pixel saturation rate of the array and a precision of the sensor corresponding to a ratio between the distances between the sensor and elements of the scene and the standard deviation of the distances between the sensor and the elements of the scene.

Advantageously, the method includes a comparison of the pixel saturation rate with a saturation rate threshold, and if the pixel saturation rate is greater than the saturation rate threshold, a reduction in the exposure time, otherwise a comparison of the precision with a precision threshold ($T_{prec}$), and if the precision is greater than the precision threshold, a reduction in the exposure time, otherwise, an increase in the exposure time.

In an advantageous embodiment, the method includes an adjustment of the exposure time of the sensor by increasing or by reducing the value of the exposure time by a percentage between a minimum step and a maximum step.

Preferably, the precision is evaluated from the mathematical formula $$\frac{z^2}{\sigma_z^2},$$

wherein z is a distance between an element of the scene with respect to the sensor and $\sigma_z$ is the standard deviation of the distances between the sensor and the elements of the scene.

In an advantageous embodiment, if the saturation rate threshold is incompatible with the precision threshold, then the method includes an updating of the precision threshold with the saturation rate.

BRIEF DESCRIPTION OF THE SEVERAL VIEWS OF THE DRAWINGS

Other advantages and characteristics of principles of the present disclosure shall appear when examining the detailed description of embodiments, in no way limiting, and of accompanying drawings wherein:

FIG. 1 is a block diagram of an indirect time-of flight (iTOF) measurement sensor, according to one embodiment.

FIG. 2 is flow diagram of a method for adjusting the exposure time of an iTOF sensor, according to one embodiment.

FIG. 3 is a flow diagram illustrating factors taken into account in adjusting the exposure time of pixels of a pixel array, according to one embodiment.

FIG. 4 is a flow diagram of a method for determining the exposure time of an iTOF sensor, according to one embodiment.

DETAILED DESCRIPTION

FIG. 1 shows an indirect iTOF sensor, according to one embodiment. The iTOF sensor includes a pixel array PXM. The iTOF sensor also includes a control unit UC configured to control the pixel array PXM.

The iTOF sensor is configured to emit a light signal in a scene wherein the iTOF sensor is placed. This light signal can then be reflected by the different elements of the scene to the pixel array PXM.

The pixel array PXM is configured to carry out acquisitions of successions of images of the scene by accumulating the light signals that it detects.

The successions of images acquired allow the control unit UC to determine a phase shift between the signal emitted by the sensor and the signals reflected by the elements of the scene and detected by the pixel array PXM. The control unit UC is then configured to calculate a distance between this sensor and the elements of the scene from the determined phase shift.

The acquisition of the images is carried out during an exposure time that can be adapted so as to offset the various luminosities of the images acquired.

The control unit UC is also configured to adapt the exposure time of the pixels of the array PXM for each acquisition of a succession of images.

The exposure time is adapted according to the method for adjusting the exposure time described hereinafter in relation with FIG. 2.

FIG. 2 shows a method for adjusting the exposure time of the pixels of a pixel array PXM of an iTOF sensor such as the one shown in FIG. 1.

The method for adjusting includes a step 20 of acquiring wherein a succession of images is acquired by the pixel array PXM during a given exposure time $T_{int}$. The pixels then deliver the data acquired to the control unit.

The method for adjusting further includes a step 21 of determining statistics STAT to be taken into account for the adjusting of the exposure time $T_{int}$. As shown in FIG. 3, the statistics to be taken into account are a saturation rate SAT of the pixels (corresponding to the average AVG(SAT) of the saturation rate SAT of each pixel), the distances Z between the elements of the scene and the sensor and the standard deviation of these distances $\sigma_z$. Thus, the determining of the statistics includes a determining of a saturation rate SAT of the pixels. The determining of the statistics also includes a calculating of distances Z of elements of the scene with respect to the sensor from data delivered by the pixels. The determining of the statistics further includes a calculating of a standard deviation $\sigma_z$ of the distances of the elements of the scene with respect to the sensor. The standard deviation is calculated from a confidence index CI determined by the control unit UC.

In particular, the distances between the elements of the scene and the sensor and the standard deviation of the distances are used to determine a precision of the measurements with respect to the distances. In particular, the precision is determined by the formula $$\frac{\sigma_z}{z},$$

wherein z corresponds to the distance of an element of the scene with respect to the sensor, and $\sigma_z$ corresponds to the standard deviation of the distances of the elements of the scene with respect to the sensor. An average of the precision $$AVG\left(\frac{\sigma_z}{z}\right)$$

corresponding to the precision of the succession of acquired images. However, for reasons of simplification, it is preferable to use the formula $$\frac{z^2}{\sigma_z^2}$$

to evaluate the precision of the sensor. Indeed, this method has the advantage of varying linearly with respect to the exposure time.

The method for adjusting then includes a step 22 of determining an exposure time $T_{int}$ to be applied. In this step 22, the control unit UC determines the exposure time $T_{int}$ to be applied for the next acquisition of images according to the statistics determined in step 21.

Finally, the method for adjusting includes a step 23 of updating the exposure time $T_{int}$. In this step 23, the control unit UC updates the exposure time to be applied for the next acquisition by the exposure time $T_{int}$ determined in step 22.

Steps 20 to 23 are repeated for each acquisition of images.

FIG. 4 shows step 22 of determining the exposure time $T_{int}$ to be applied for the next acquisition. This step 22 of determining the exposure time first includes a comparison 30 of the saturation rate calculated in step 21 with respect to a given saturation rate threshold $T_{sat}$. A measured saturation rate that is greater than the saturation rate $T_{sat}$ means that the pixels of the array PXM are overexposed. A measured saturation rate that is less than the saturation rate threshold T sat means that the pixels of the array PXM are underexposed.

If the calculated saturation rate is greater than the given saturation rate threshold $T_{sat}$, then the exposure time $T_{int}$ to be applied is decreased with respect to the previously applied exposure time $T_{int}$.

If the calculated saturation rate is less than the given saturation rate threshold, then step 22 includes a comparison 31 of the saturation rate threshold $T_{sat}$ and the precision threshold $T_{prec}$ making it possible to determine if the given saturation rate threshold $T_{sat}$ is compatible with a given precision threshold $T_{prec}$.

Comparing in a first step the saturation rate with the saturation rate threshold T sat makes it possible to prevent saturating the pixels of the array.

If the given saturation rate threshold $T_{sat}$ is compatible with the given precision threshold $T_{prec}$, the step 22 includes a comparison 32 between a calculated precision and the given precision threshold $T_{prec}$. A precision greater than the precision threshold $T_{prec}$ means that the data acquired from the pixel array PXM is too precise. A precision less than the precision threshold $T_{prec}$ means that the data acquired from the pixel array PXM is not precise enough.

If the calculated precision is greater than the given precision threshold $T_{prec}$, then the exposure time $T_{int}$ to be applied is decreased with respect to the previously applied exposure time $T_{int}$.

If the calculated precision is less than the given precision threshold $T_{prec}$, then the exposure time $T_{int}$ to be applied is increased with respect to the previously applied exposure time $T_{int}$.

Moreover, if the given saturation rate threshold $T_{sat}$ is incompatible with the given precision threshold $T_{prec}$, then step 22 includes an updating 33 of the precision threshold $T_{prec}$ with the saturation rate $T_{sat}$. In practice, the precision threshold $T_{prec}$ is updated with a value proportional to $T_{sat}$ in order to prevent a phenomenon of blinking of the luminosity of the images. The proportionality coefficient being a parameter that can be adjusted of the algorithm between zero and one. Then, step 22 includes the comparison 32 between the calculated precision and the given precision threshold $T_{prec}$, before adjusting the exposure time $T_{int}$ as described hereinabove.

During step 22, the control unit UC thus adjusts the exposure time of the sensor by increasing or by reducing the value of the exposure time $T_{int}$ by a percentage between a minimum step and a maximum step. This minimum step and this maximum step are defined parameters of the algorithm and known by the control unit.

The iTOF sensor is therefore configured to adapt the exposure time for an acquisition of a succession of images not only according to a saturation rate of the sensor but also according to the distance between the elements of the scene and the sensor as well as the standard deviation of the distances between the elements of the scene and the sensor.

In particular, the distance between the elements of the scene and the iTOF sensor as well as the standard deviation of the distances between the elements of the scene and the sensor make it possible to define a precision of the acquisition with respect to the distance of the elements of the scene with respect to the sensor.

The iTOF sensor is therefore configured to adapt the exposure time according to a saturation rate of the sensor and a precision of the acquisition. Such an adjustment of the exposure time makes it possible to optimize a compromise between an energy consumption of the sensor and a signal-to-noise ratio of the sensor. By taking account of the precision of the acquisition to define the exposure time, it is possible to reduce the exposure time to obtain a desired precision and a desired saturation of the pixels. The sensor therefore makes it possible to prevent an undesired increase in the exposure time which would result in excessively high precision of the sensor with respect to the distance of the elements of the scene with respect to the sensor.

An indirect time-of-flight measurement sensor may be summarized as including: a photosensitive pixel array (PXM) configured to acquire a succession of images of a scene during a given exposure time, a control unit (UC) configured to control an acquisition of a succession of images by the pixel array (PXM) and to define an exposure time for this acquisition according to a pixel saturation rate of the array (PXM), distances (z) between the sensor and elements of the scene and a standard deviation ($\sigma_z$) of the distances between the sensor and the elements of the scene.

The control unit (UC) may be configured to define the exposure time ($T_{int}$) for the acquisition from the pixel saturation rate of the array (PXM) and a precision of the sensor corresponding to a ratio between the distances (z) between the sensor and elements of the scene and the standard deviation ($\sigma_z$) of the distances between the sensor and the elements of the scene.

The control unit (UC) may be configured to compare the pixel saturation rate with a saturation rate threshold ($T_{sat}$), and to: if the pixel saturation rate is greater than the saturation rate threshold ($T_{sat}$), reduce the exposure time ($T_{int}$), otherwise compare the precision to a precision threshold ($T_{prec}$), and if the precision is greater than the precision threshold ($T_{prec}$), reduce the exposure time ($T_{int}$), otherwise, increase the exposure time ($T_{int}$).

The control unit (UC) may be configured to adjust the exposure time of the sensor by increasing or by reducing the value of the exposure time ($T_{int}$) by a percentage between a minimum step and a maximum step.

The precision may be evaluated from the mathematical formula $$\frac{z^2}{\sigma_z^2},$$

wherein z is a distance between an element of the scene with respect to the sensor and $\sigma_z$ is the standard deviation of the distances between the sensor and the elements of the scene.

The saturation rate threshold ($T_{sat}$) may be incompatible with the precision threshold ($T_{prec}$), then the control unit is configured to update the precision threshold ($T_{prec}$) with the saturation rate ($T_{sat}$).

The method for defining an exposure time for an acquisition of a succession of images of a scene by pixels of a photosensitive pixel array (PXM) of an indirect time-of-flight measurement sensor during a given exposure time, the method may be summarized as including a definition of the exposure time for the acquisition according to a pixel saturation rate of the array (PXM), of the distances between the sensor and elements of the scene and a standard deviation of the distances between the sensor and the elements of the scene.

The method may include a definition of the exposure time ($T_{int}$) for the acquisition from the pixel saturation rate of the array (PXM) and a precision of the sensor corresponding to a ratio between the distances (z) between the sensor and elements of the scene and the standard deviation ($\sigma_z$) of the distances between the sensor and the elements of the scene.

The method may include a comparison of the pixel saturation rate with a saturation rate threshold ($T_{sat}$), and if the pixel saturation rate is greater than the saturation rate threshold ($T_{sat}$), a reduction in the exposure time ($T_{int}$), otherwise a comparison of the precision with a precision threshold ($T_{prec}$), and if the precision is greater than the precision threshold ($T_{prec}$), a reduction in the exposure time ($T_{int}$), otherwise, an increase in the exposure time ($T_{int}$).

The method may include an adjustment of the exposure time ($T_{int}$) of the sensor by increasing or by reducing the value of the exposure time ($T_{int}$) by a percentage between a minimum step and a maximum step.

The precision may be evaluated from the mathematical formula $$\frac{z^2}{\sigma_z^2},$$

wherein z is a distance between an element of the scene with respect to the sensor and $\sigma_z$ is the standard deviation of the distances between the sensor and the elements of the scene.

If the saturation rate threshold ($T_{sat}$) is incompatible with the precision threshold ($T_{prec}$), then the method may include an updating of the precision threshold ($T_{prec}$) with the saturation rate ($T_{sat}$).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An indirect time-of-flight measurement sensor, comprising:

a photosensitive pixel array configured to acquire a succession of images of a scene during a given exposure time; and a control unit configured to control an acquisition of a succession of images by the pixel array and to define an exposure time for the acquisition according to a pixel saturation rate of the array, distances between the sensor and elements of the scene, and a standard deviation of the distances between the sensor and the elements of the scene, wherein the control unit is configured to define the exposure time for the acquisition from the pixel saturation rate of the array and a precision of the sensor corresponding to a ratio between the distances between the sensor and elements of the scene and the standard deviation of the distances between the sensor and the elements of the scene, wherein the control unit is configured to compare the pixel saturation rate with a saturation rate threshold, and to:

if the pixel saturation rate is greater than the saturation rate threshold, reduce the exposure time, otherwise compare the precision to a precision threshold, and if the precision is greater than the precision threshold, reduce the exposure time, otherwise, increase the exposure time.

2. The sensor according to claim 1, wherein the control unit is configured to adjust the exposure time of the sensor by increasing or by reducing the value of the exposure time by a percentage between a minimum step and a maximum step.

3. The sensor according to claim 2, wherein the precision is evaluated from the mathematical formula $$\frac{x^2}{\sigma_z^2},$$

wherein z is a distance between an element of the scene with respect to the sensor and $\sigma_z$ is the standard deviation of the distances between the sensor and the elements of the scene.

4. The sensor according to claim 3, wherein, if the saturation rate threshold is incompatible with the precision threshold, then the control unit is configured to update the precision threshold with the saturation rate.

5. A method, comprising:

acquiring a succession of images of a scene with pixels of a photosensitive pixel array of an indirect time-of-flight measurement sensor during a given exposure time; and defining the exposure time for the acquisition based on a pixel saturation rate of the array, distances between the sensor and elements of the scene, and a standard deviation of the distances between the sensor and the elements of the scene;

defining the exposure time for the acquisition based on the pixel saturation rate of the array and a precision of the sensor corresponding to a ratio between the distances between the sensor and elements of the scene and the standard deviation of the distances between the sensor and the elements of the scene;

comparing the pixel saturation rate with a saturation rate threshold, and if the pixel saturation rate is greater than the saturation rate threshold, reducing the exposure time, otherwise comparing the precision with a precision threshold, and if the precision is greater than the precision threshold, reducing the exposure time, otherwise, increasing the exposure time.

6. The method according to claim 5, comprising adjusting the exposure time of the sensor by increasing or by reducing the value of the exposure time by a percentage between a minimum step and a maximum step.

7. The method according to claim 6, comprising evaluating the precision from the mathematical formula $$\frac{x^2}{\sigma_z^2},$$

wherein z is a distance between an element of the scene with respect to the sensor and $\sigma_z$ is the standard deviation of the distances between the sensor and the elements of the scene.

8. The method according to claim 7, comprising updating the precision threshold with the saturation rate if the saturation rate threshold is incompatible with the precision threshold.

9. A method, comprising:

sensing, for each of a plurality of objects, a distance between a sensor and the object;

calculating a standard deviation of the distances;

selecting, with a control unit of the sensor, an exposure time based on a pixel saturation rate of a photosensitive pixel array of the sensor and on the standard deviation of the distance;

acquiring, with a photosensitive pixel array of a sensor, a plurality of images of the objects with the selected exposure time;

selecting the exposure time based on a precision of the sensor, wherein the precision of the sensor corresponds to a ratio between the distances and the standard deviation of the distances;

comparing, with the control unit, the pixel saturation rate with a saturation rate threshold;

reducing the exposure time if the pixel saturation rate is greater than the saturation rate threshold; and, comparing the precision to a precision threshold if the pixel saturation rate is less than the saturation rate threshold;

reducing the exposure time if the precision is greater than the precision threshold; and increasing the exposure time if the precision is less than the precision threshold.

10. The method of claim 9, comprising adjusting the exposure by increasing or by reducing the value of the exposure time by a percentage between a minimum step and a maximum step.

11. The method of claim 10, comprising evaluating, with the control unit, the precision from a mathematical formula $$\frac{x^2}{\sigma_z^2},$$

wherein z is a distance between an object and the sensor, wherein $\sigma_z$ is the standard deviation of the distances between the sensor and the elements of the scene.

12. The method of claim 11, comprising updating the precision threshold with the saturation rate, if the saturation rate threshold is incompatible with the precision threshold.

* * * * *